United States Patent [19]

Hylton et al.

[11] Patent Number: 5,629,682

[45] Date of Patent: May 13, 1997

[54] MAGNETIC RECORDER HAVING MR READ AND INDUCTIVE WRITE CAPABILITY

[75] Inventors: Todd L. Hylton, San Jose; Richard D. Umphress, Morgan Hill, both of Calif.

[73] Assignee: International Business Machines Corporation, Armonk, N.Y.

[21] Appl. No.: 359,492

[22] Filed: Dec. 20, 1994

[51] Int. Cl.$^6$ ............................ G11B 5/02; G11B 5/33; G11B 5/127

[52] U.S. Cl. ............................ 340/671; 360/55; 360/113

[58] Field of Search ............................ 360/7, 55, 73.03, 360/113, 46, 66, 77.04, 77.05, 78.14, 31, 97.01; 29/281.5; 112/275; 250/231.14, 227.12; 324/207.12, 207.25; 364/489; 340/670, 671

[56] References Cited

U.S. PATENT DOCUMENTS

| | | | |
|---|---|---|---|
| 3,937,880 | 2/1976 | Schlenker | 360/7 |
| 4,102,028 | 7/1978 | Currie | 29/281.5 |
| 4,234,899 | 11/1980 | Feldstein et al. | 360/73.03 |
| 4,343,992 | 8/1982 | Blaser | 250/231.14 |
| 4,599,561 | 7/1986 | Takahashi et al. | 324/207.12 |
| 5,210,700 | 5/1993 | Tom | 364/489 |
| 5,271,348 | 12/1993 | Cameron et al. | 112/275 |

FOREIGN PATENT DOCUMENTS

| | | |
|---|---|---|
| 61-134822 | 6/1986 | Japan. |
| 62-39178 | 2/1987 | Japan. |
| 62-39179 | 2/1987 | Japan. |
| 3-291297 | 11/1991 | Japan. |

*Primary Examiner*—Aristotelis Psitos
*Assistant Examiner*—Patrick Wamsley
*Attorney, Agent, or Firm*—Baker, Maxham, Jester & Meador

[57] ABSTRACT

A magnetic encoder apparatus for determining the position of a moving object. The encoder has a merged magnetoresistive (MR) head capable of maintaining a magnetic transducing relationship with a magnetic medium on a substrate while there is relative motion between the head and the medium. The merged MR head contains an MR read element and an inductive transducer write element. The inductive transducer write element is capable of writing encoded bits that contain information that defines a position of the substrate. The MR read element is capable of reading these encoded bits and generating an output signal. The output signal is processed by electronic circuitry in order to decipher the position of the moving object that is coupled with the encoder.

33 Claims, 10 Drawing Sheets

MAGNETIC RECORDER HAVING MR READ AND INDUCTIVE WRITE CAPABILITY

BACKGROUND OF THE INVENTION

1. Field of the Invention

The present invention pertains to a position detecting device, and more particularly to a magnetic encoder which can write an encoded signal and then read the same encoded signal to determine a position of a moving object.

2. Description of the Related Art

Several techniques for monitoring position of a moving object, such as a rotating shaft, are known. Typically, an encoder is employed to determine the position of a rotating shaft. Once the position is determined, information such as speed and rotational direction of the rotating shaft can be determined by recording the change in position over time. Such encoders may determine either "incremental" or "absolute" positions and may be implemented by various means, including magnetic means and optical means.

Referring to FIGS. 1 and 2, a typical 8 bit disk 20 useful with an absolute encoder and its respective output 30 is shown. An absolute encoder provides a "whole word" output with a unique code pattern representing each position. The code is derived from light transmitting sources 32, such as light emitting diodes (LEDs), passing through slits 33 which are placed on independent tracks corresponding to individual photodetectors 34. The output from these detectors would be high or low ("1" or "0" respectively) depending on the code disk pattern for that particular position. For example, disk pattern 36 sensed by photodetectors 34 yields an output having a digital binary value of "1". The number of tracks determines the amount of information that can be derived from a revolution of the disk. For example, if the disk has ten tracks, the resolution of the encoder would be $2^{10}$ or 1024 positions per revolution of the disk. In order to count multiple revolutions additional disks are attached to the primary high resolution disk and geared at some ration, for example, an 8:1 ratio. There is no theoretical limit to the number of disks that may be added; however, there are practical limits and limitations with space have resulted in encoders that typically have no more than 512 turns available.

An absolute encoder determines the actual position of a rotating shaft at any point of the shaft's revolution within an established radial resolution and within a fixed number of total revolutions. Absolute encoders rely on determining that a fixed location on the disk (e.g., the location of an LED) is presently at a predetermined position. Thus, they are not well suited for monitoring swiftly changing conditions. Typical applications are those where a device is inactive for long periods of time or moves at a slow rate, such as flood gate control, telescopes, and construction cranes.

An incremental encoder determines the position of a shaft by providing markers at discrete measured intervals which can be counted to determine how far the shaft has rotated. This is commonly accomplished by attaching an incremental encoder directly to the end of a motor shaft. The motor is controlled in a conventional manner to rotate the shaft to a certain position or turn at a designated speed. The encoder responds by creating a square wave and the peaks of the wave can be counted by known circuits to determine the position of the rotating shaft. Once the one position of the shaft is known, and the time between one position to the next is known, the speed and direction (velocity) of the motor can be determined. By using a known technique of closed loop feedback control, a precise desired speed of rotation can be achieved after some passage of time. Another common type of incremental encoder allows for feedback control by measuring relative speed or angle of rotation and comparing the measured values to known values such as clock time, or angular position relative to a known fixed point.

Referring to FIGS. 3 and 4, an incremental code disk 40 typically employed with an optical incremental encoder 50 is shown. A series of slots 42 in the disk 40 are counted as the disk rotates in the following fashion. In high resolution encoders the spacing 44 between slots can be as small as 50 microns. A light source 60 mounted on bearing housing assembly 62 shines a beam of light continuously. As the code disk rotates on spindle 64 the light shines through the slots 42. For increased light resolution the light source is collimated and passed through a mask 58. The mask is disposed between the disk and the photodetector 56 so that the slots 42 and the mask 58 produce a shuttering effect. As a result, light is only allowed to pass to the photodetector 56 when the slots and the transparent sections of the mask are in alignment. The photodetector 56 is part of the photodetector assembly 57. The photodetector assembly is coupled to the electronics board 54 such that a signal can be created in response to the sensing of the light through the mask. The counter circuit 52 in electronics board 54 counts the pulses so that the number of slots having rotated past the photodetector is known. Since each slot corresponds to some incremental angular displacement, determining the number of slots also determines the total angular displacement of the disk.

The following example explains the operation of an incremental encoder. A typical prior art incremental encoder creates a series of square waves. The number of square waves corresponds to a predetermined mechanical increment. For example, to divide a shaft revolution into 1000 parts, an encoder could be selected to supply 1000 square wave cycles per revolution. By using a counter circuit to count those cycles, it could be determined how far the shaft has rotated. For example, 100 counts would equal 36 degrees, and 1000 counts would equate to an entire revolution. Unfortunately, the number of cycles per revolution is limited by the amount of slots that can be placed in the disk. Thus, physical parameters such as physical line spacing, also known as granularity, and quality of light transmission limit the precise measurement of rotational displacement. Consider the example of a disk that is divided into 1000 parts and another that is divided into 10000 parts. Naturally, the one having 10000 parts has 10 times more granularity and this allows for precise measurements. Unfortunately, there are practical physical limits that prevent achieving such fine granularity on an optical disk. The current technology permits incremental resolution up to 2540 cycles per turn on an encoder disk. Higher resolutions are available through various multiplication techniques but an inherent disadvantage is the extra time and performance overhead associated with such cumbersome calculations. Generally, incremental encoders provide more resolution at a lower cost than their absolute encoder cousins.

Magnetic encoders are generally not preferred over optical encoders because they are very large by comparison. Also magnetic encoders have upper limits of around 1200 discrete pulses per revolution. Typically, magnetic encoders operate under the principal of a heavy duty rotating magnetized drum placed in proximity to a read element such as a non-contact magnetoresistive (MR) sensor. Such a magnetic encoder is shown in Japanese laid-open patent applications, application numbers 62-39178 and 62-39179. In such an encoder, a drum rotates as a MR sensor picks up the changes in the magnetic fields and produces a square wave that is translated to the high/low or digital "1"/"0" states. Accordingly, the position of a shaft coupled with the magnetic encoder can be determined by the amplitude readings from the square wave.

A variation of a magnetic encoder useful as an absolute encoder is disclosed in U.S. Pat. No. 4,599,561 by Takahashi et al. The disclosed encoder employs a plurality of MR sensors formed opposite to an encoded track on a rotating body. The encoded track that is used for speed control is disclosed as being arranged to be magnetically opposed to a position detecting track in order to eliminate magnetic interference. The position detecting track is used in the conventional sense to determine the rotational position of a rotating body. The encoded track contains information on how to respond to this position information. Unfortunately, Takahashi does not disclose any means for changing the encoded information or the position information once the encoder is created. That is the encoder can not be changed dynamically to suit a new purpose.

In general all of the above listed devices, optical and magnetic, have an electronic data transfer rate in the 100–200 Khz range. Although some optical incremental encoders cost as little as $200 to $500, the more sophisticated absolute encoders tend to cost around $2000. The very high encoders having the highest resolution may cost around $5000 to $6000. Generally, cost increases as resolution increases.

Another disadvantage of prior art optical encoders is that an encoder being configured to have a specified resolution can not be changed to another resolution. This is also the case with magnetic encoders once the track is encoded with magnetic information. It would be desirable to provide a means wherein a low cost but high resolution encoder could be changed dynamically according to the need at any given time. However, prior to the present invention there has not existed such an encoder.

SUMMARY OF THE INVENTION

An objective of the present invention is to provide a magnetic encoder that can write encoded information on a magnetic medium and then read the same encoded information such that an encoded track can be changed dynamically.

One objective of the present invention is provide such a low cost encoder that is capable of determining incremental and absolute position of a rotating object.

Another objective of the present invention is to reduce cost associated with an encoder used to determine the position and subsequently the speed and direction of a rotating object.

Yet another objective of the present invention is to provide high resolution of such an encoder while also providing a low cost device in accordance with the previous objective.

One objective of the present invention is to provide an encoder that simplifies the alignment requirement between the object whose position is sensed and the encoding device.

In accordance with these objectives, the invention provides a magnetic encoder and a method for employing the encoder, wherein the encoder has the heretofore unknown ability to write encoding information and then read this same encoded information to determine the position of a moving object.

The foregoing, together with other objects, features and advantages of this invention, will become more apparent when referring to the following specification, claims and the accompanying drawings.

DETAILED DESCRIPTION OF THE PREFERRED EMBODIMENT

Figure 1:
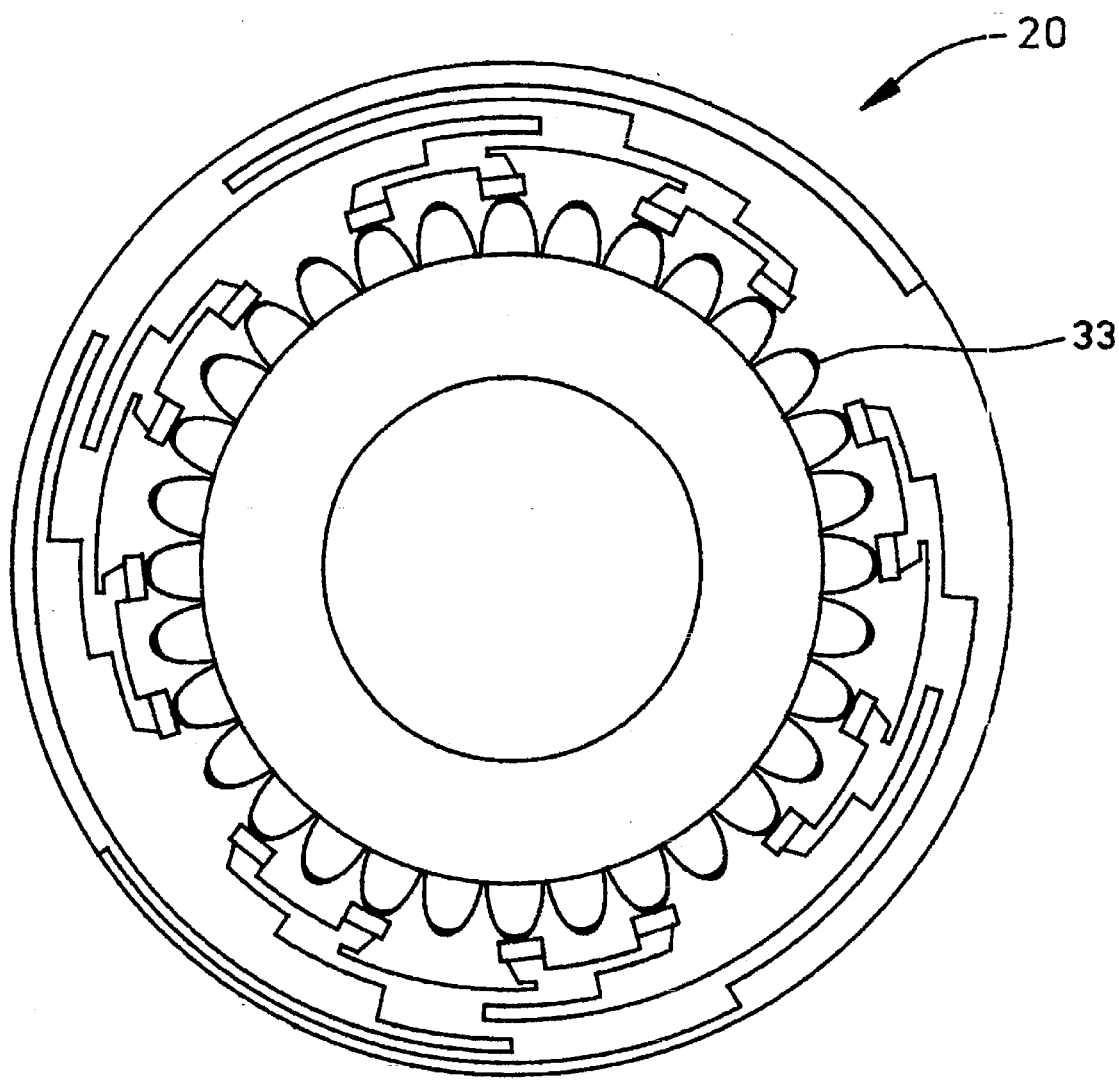
FIG. 1 shows a prior art 8-bit Optical Absolute Encoder Disk.
Figure 2:
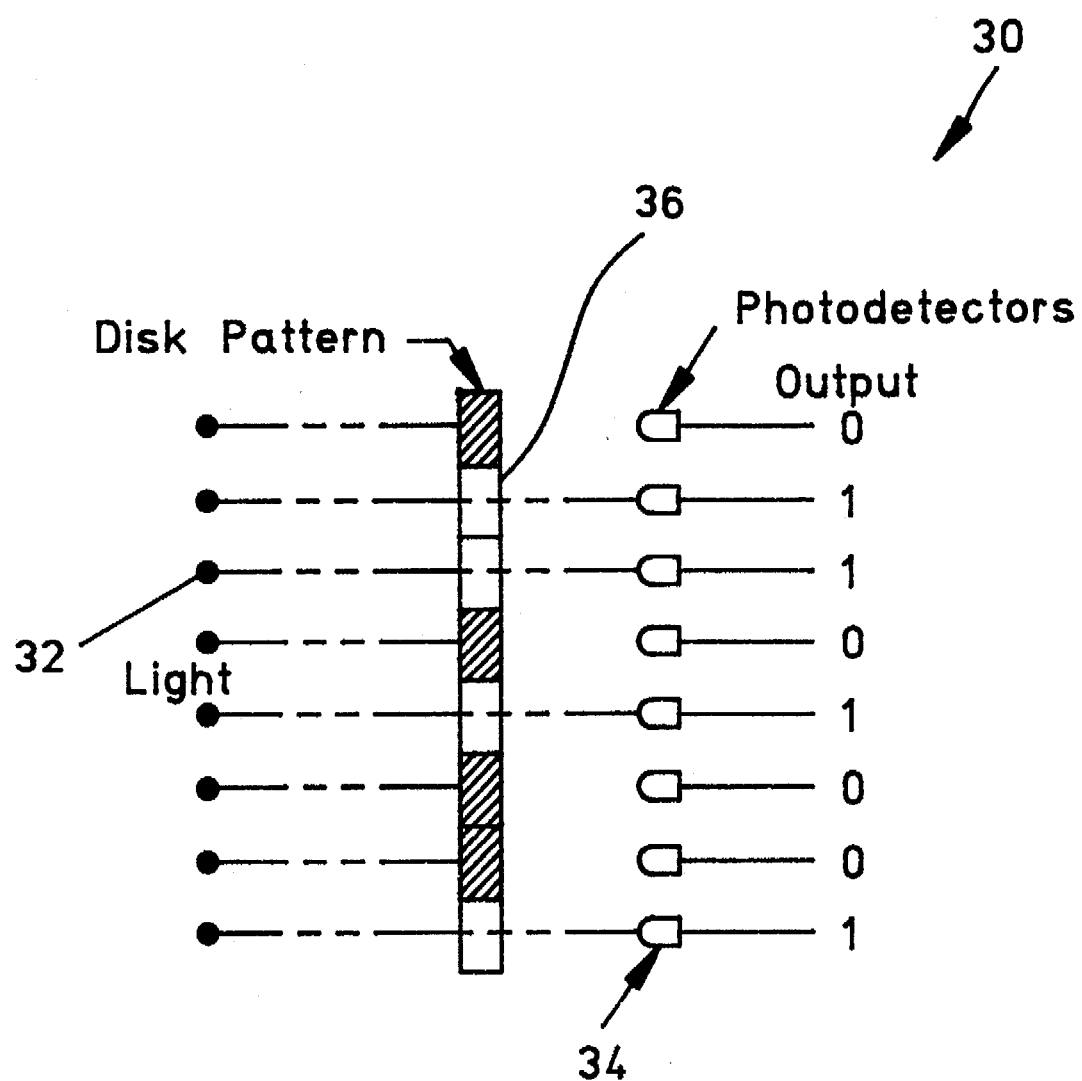
FIG. 2 shows an output chart useful for understanding a prior art Optical Absolute Encoder.
Figure 3:
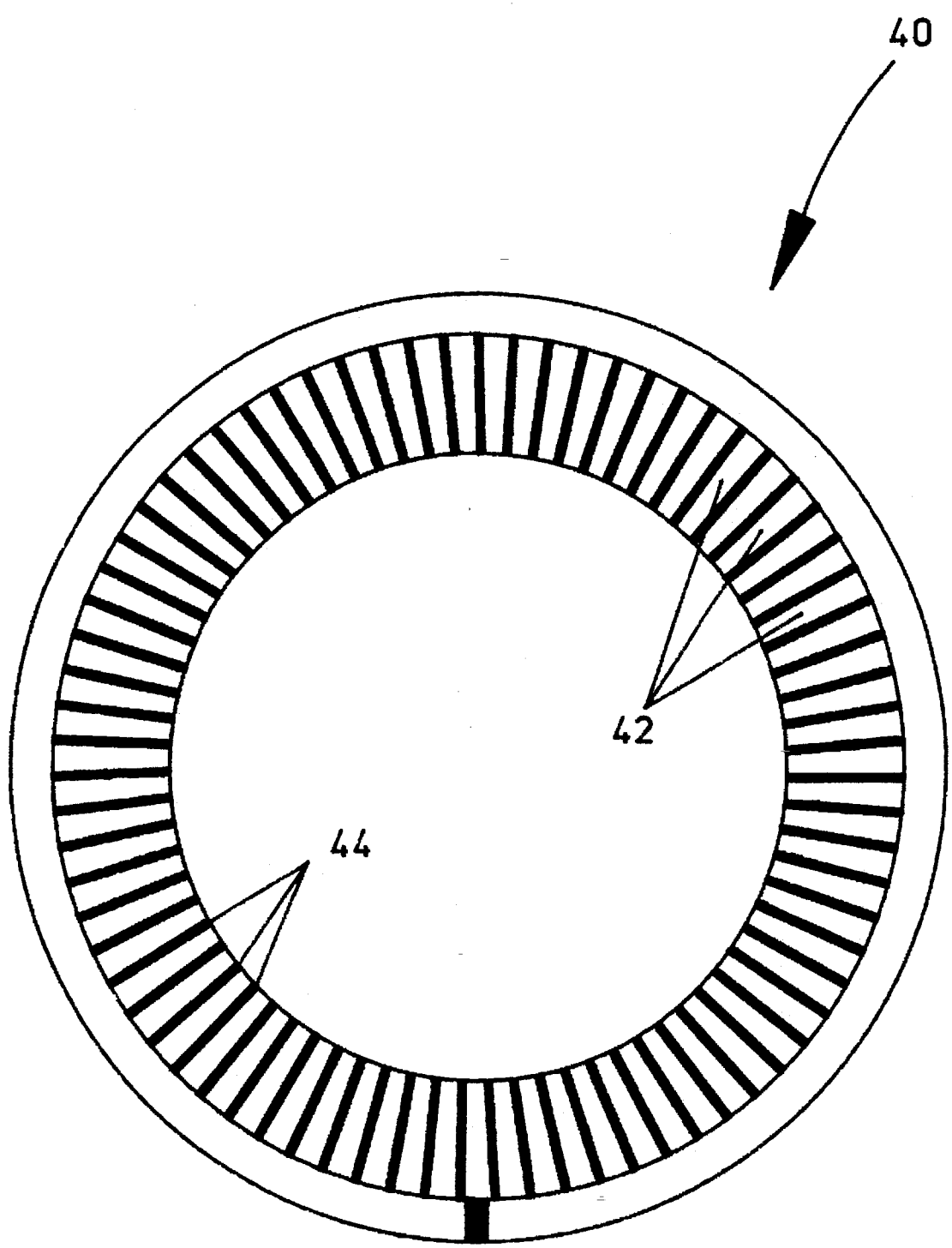
FIG. 3 shows a prior art disk useful with a prior art Optical Incremental Encoder.
Figure 4:
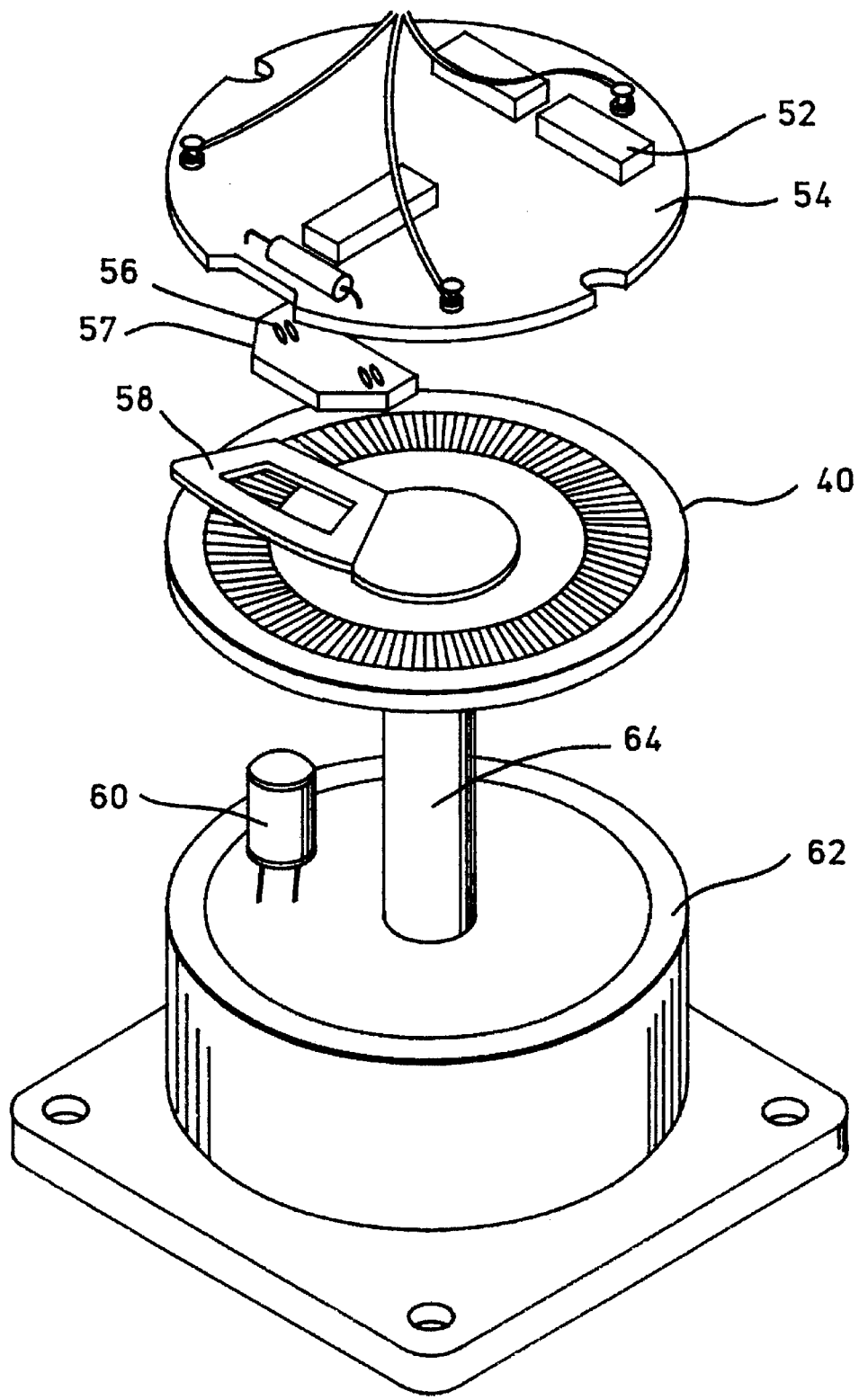
FIG. 4 shows a prior art Optical Incremental Encoder.
Figure 5:
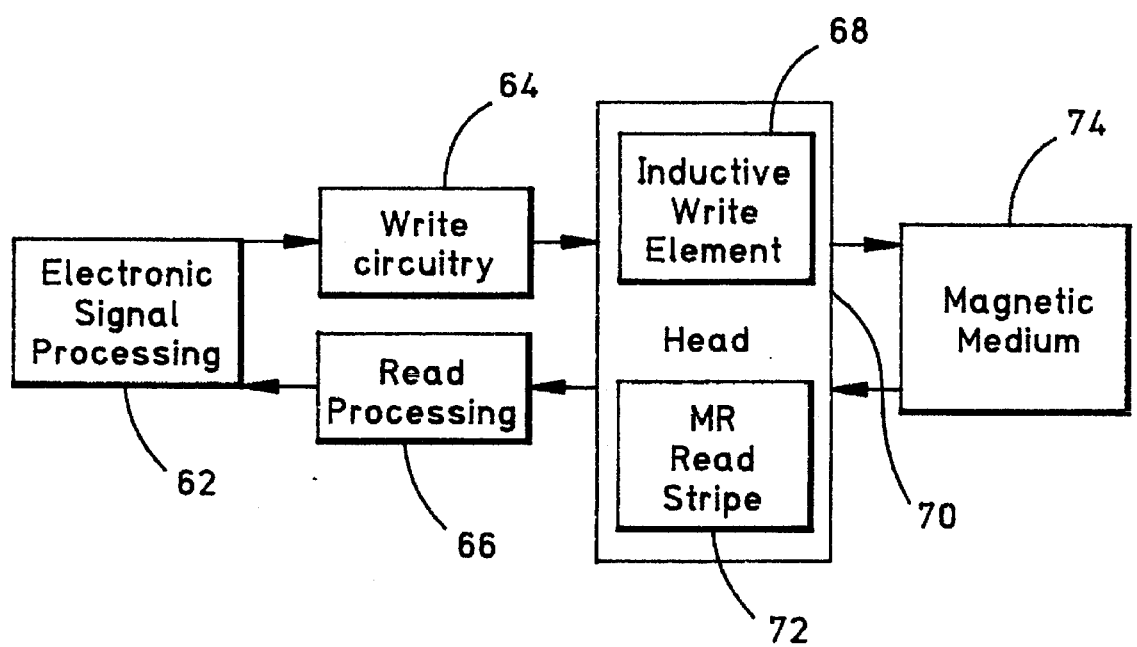
FIG. 5 shows a block diagram illustrating an overview of the present invention.

Referring now to the drawings wherein like reference numerals designate like or similar parts throughout the similar views, there is illustrated in FIG. 5 a block diagram representing an overview of the present invention. A MR read-write head 70 having an inductive write element 68 and a MR read stripe 72 is supported in a magnetically transducing relationship with a magnetic medium 74. The medium 74 is typically disposed on some form of substrate; however, it is the transducing relationship with the medium that is critical to implement the present invention. A transducing action occurs between the write element 68 and the magnetic medium 74 when a electronic signal is passed from electronic signal processing circuitry 62 to write circuitry 64. The write element 68 is an inductive coil that reacts to the electric current by producing a magnetic field. The field creates a state of magnetic flux which then changes the state of the magnetic medium 74. By taking advantage of this transducing relationship, encoded information related to a position of a moving magnetic medium (e.g. a rotating disk having a magnetic medium thereon) can be written through circuitry 62 and 64 to write element 68 and then to medium 74.

Another transducing action occurs between the MR read stripe and the medium when a MR sensor which is part of the strip detects a magnetic field on the medium 74, as is also well known in the art. It is well known that an MR read element detects magnetic field signals through the change in the resistance of the MR sensor as a function of the amount and direction of magnetic flux being sensed. Thus, since voltage and current also vary proportionately to a change in resistance according to Ohm's law, a current or voltage signal from the MR read element will be quasi-sinusoidal, since a "1" state will be registered when a magnetic field in one direction is encountered and a "0" state will be registered when a magnetic field in another direction is encountered. Due to the property of MR sensors being very sensitive to changes in flux, a great deal of information can be recorded on the magnetic medium. Thus, the MR sensor allows significantly high resolution, due to the increased information related to the position of the medium which may be encoded on the medium 74.

This encoded information can be absolute, describing a precise location on the medium, or incremental, describing a set segment of distance which may then be counted. In either case, the quasi-sinusoidal output of the MR stripe 72 can then be fed back through read processing circuitry 66 to signal processing circuitry 62. The circuit elements 62, 64, and 66 which are useful for implementation in the present invention are well known in the computer disk drive art and further reference may be made to *The Complete Handbook of Magnetic Recording*, 3rd Edition, Finn Jorgenson, for examples of such circuitry. The signal processing circuitry 62 deciphers the digital output signal of the MR read element 72 and translates it into position data related to a moving object of interest. For example, in the case of a rotating disk having a magnetic medium, a known position of a magnetic bit on the medium at any point can be translated to a speed of the rotating medium. If a shaft of interest is directly coupled to a shaft that is spinning this disk, then the speed of the two shafts can be readily discerned. In this way the present invention may be used to determine the speed of a rotating object of interest. This is a good application for an MR read-write encoder because an inherent advantage of the output of an MR head is the high signal to noise ratio made possible by MR head technology and which is entirely independent of the rotational speed. This advantage is particularly important when it is necessary to read encoded bits at very slow rotational speeds. However, it should be noted that the present invention is not limited in utility to rotational objects and may be used very effectively to discern the position of a moving object that is translating in a linear fashion. Thus, described below are various embodiments of the present invention that are in accordance with an intended application for the invention.

Embodiment Including a Disk Having a Magnetic Medium

Figure 6:
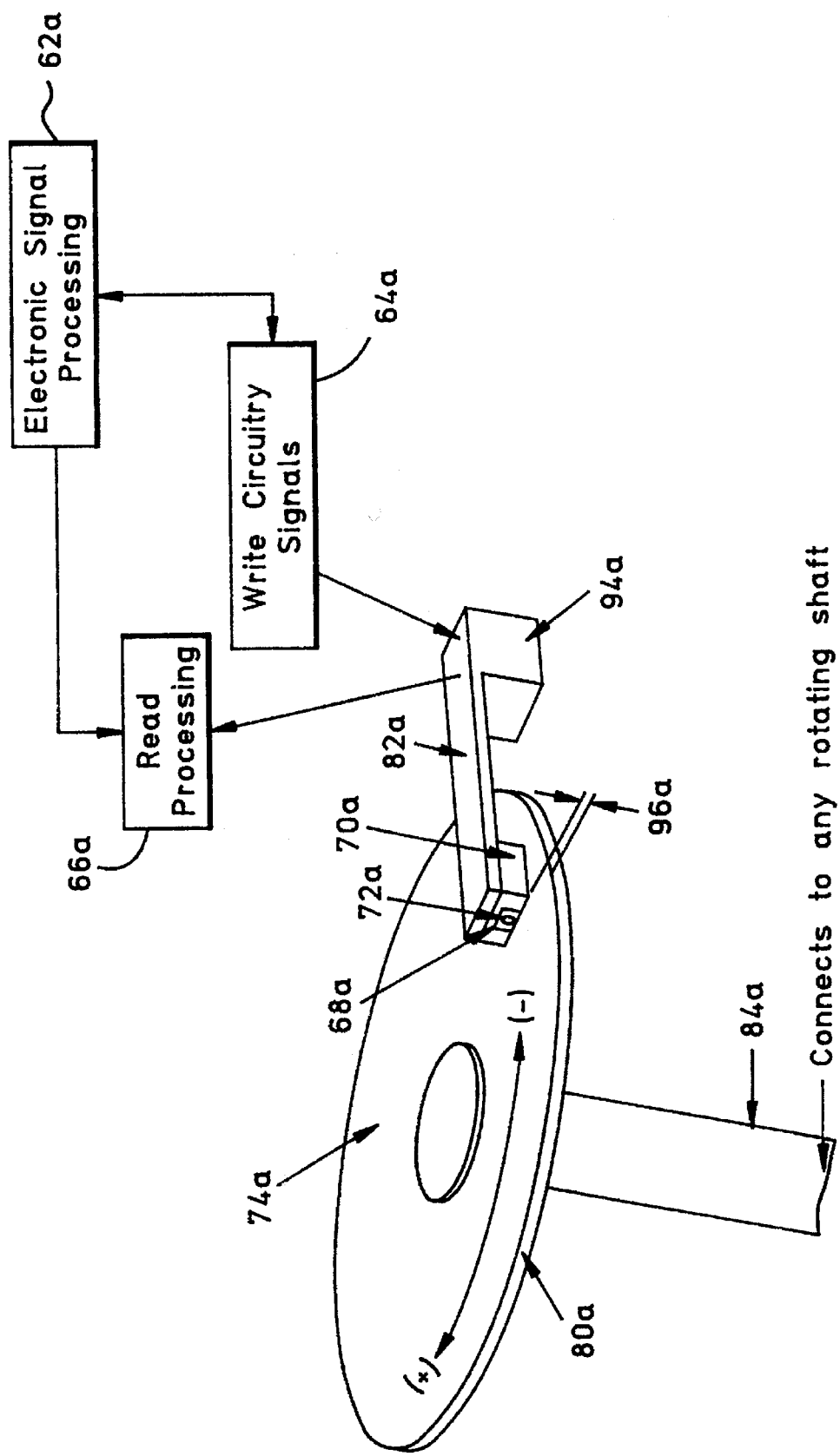
FIG. 6 shows a relationship between elements of one embodiment of the present invention.

Referring now to FIG. 6, one embodiment of the present invention comprises a substrate in the form of a disk 80a which includes a magnetic medium 74a disposed thereon. The disk 80a is rotated on spindle shaft 84a by a motor (not shown) which is responsive to control signals from a drive control source (not shown). The disk may rotate clockwise, $\alpha_{(+)}$, or counterclockwise, $\alpha_{(-)}$, in the geometric relationship with a thin film MR read-write head 70a, as shown. When the disk 80a is rotated, the head 70a, mounted on support 82a, is preferably supported above a surface of the disk 80a by a thin layer of air called an "air bearing" shown as gap 96a. However, the gap 96a may be about zero millimeters so that the head 70a is effective in direct contact with the head 70a, as long as an appropriate MR read-write head is chosen. In the case of a thin-film head an air bearing of sufficient height to allow the head to "fly" above the magnetic medium 74a is preferred. The read-write head 70a includes a MR read strip 72a and a write element 68a. The head suspension assembly 82a includes means for conducting read/write signals between drive electronics 62a–66a and the head that are discussed below. Mounting block 94a may be rigidly fixed or may be attached to an armature mechanism so that the head may move in a radial direction along disk 80a.

Embodiment Including a Drum Having a Magnetic Medium

Figure 7:
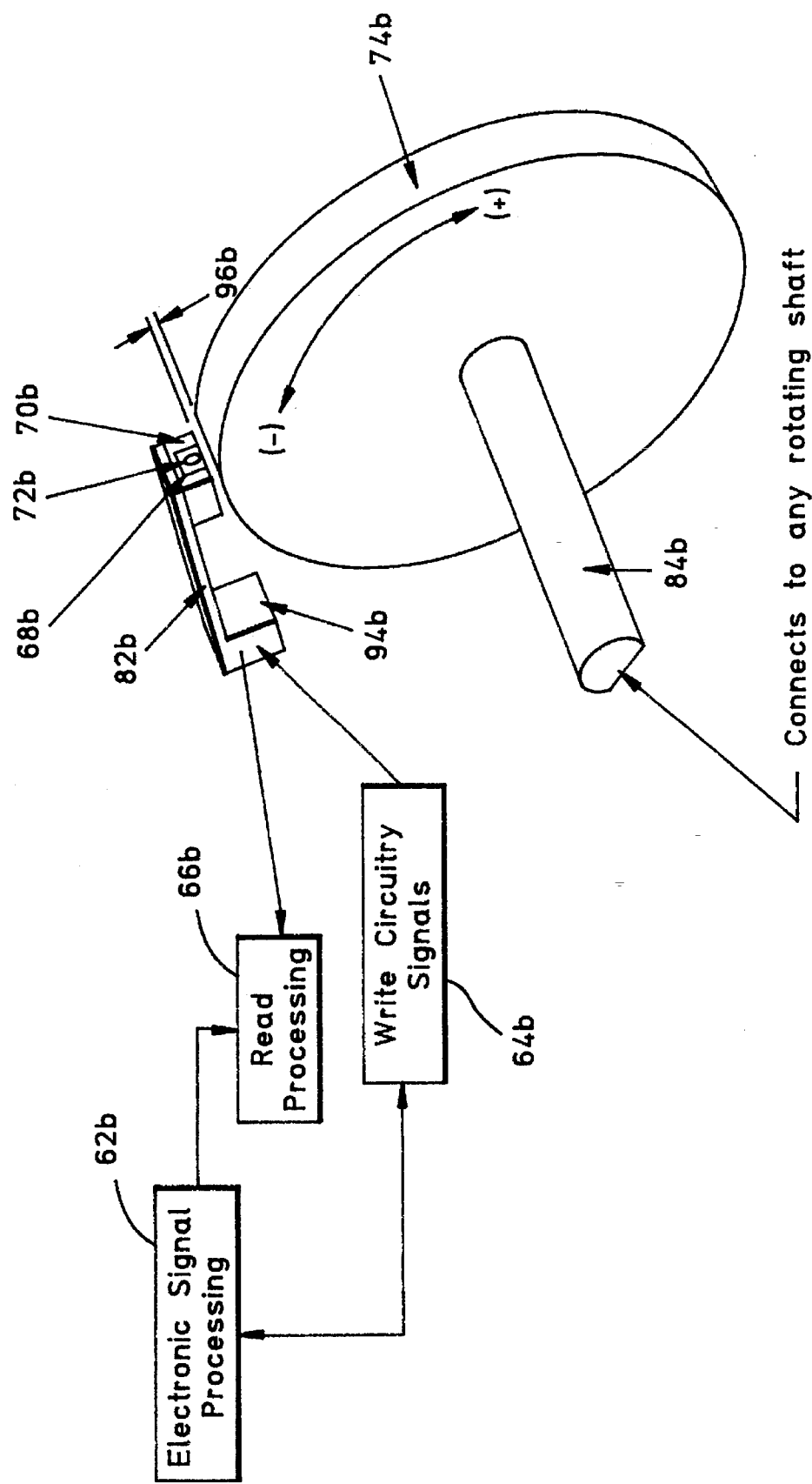
FIG. 7 shows a relationship between elements of another embodiment of the present invention.

Referring now to FIG. 7, another embodiment of the present invention comprises a substrate in the form of a drum 80b which includes a magnetic medium 74b disposed thereon. The drum 80b is rotated on spindle shaft 84b by a motor (not shown) which is responsive to control signals from a drive control source (not shown). The drum may rotate clockwise, $\alpha_{(+)}$, or counterclockwise, $\alpha_{(-)}$, in the geometric relationship with a thin film MR read-write head 70b as shown. When the drum 80b is rotated, the head 70b, mounted on support 82b, is preferably supported, above a surface of the disk 80b by a thin layer of air called an "air bearing" shown as the gap 96b; however, the head 70b may be direct contact with the head 70b, as long as an appropriate MR read-write head is chosen. In the case of a thin-film head an air bearing of sufficient height to allow the head to "fly" above the magnetic medium 74b is preferred. The read-write head 70b includes an MR read strip 72b and a write element 68b. The head suspension assembly 82b includes means for conducting read/write signals between drive electronics 62b–66b and the head. Mounting block 94b may be rigidly fixed or may be attached to an armature mechanism so that the head may move across the plane of rotation of the medium 74b.

Embodiment Including a Linear Substrate Having a Magnetic Medium

Figures 8, 9:
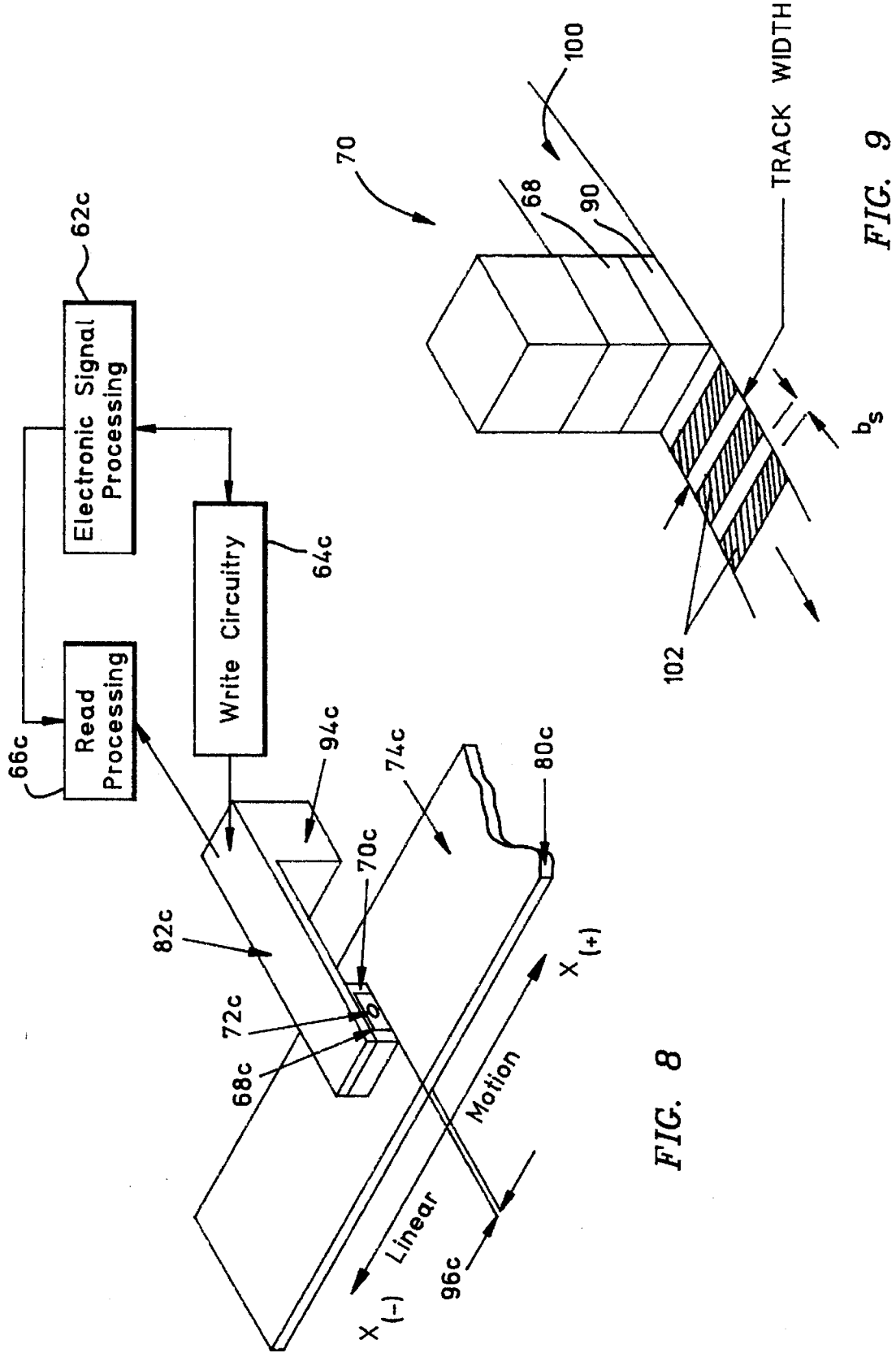
FIG. 8 shows a relationship between elements of one other embodiment of the present invention.
FIG. 9 shows a relationship between a MR read-write head and a magnetic medium, each of which is employed in the present invention.

Referring now to FIG. 8, still another embodiment of the present invention comprises a substrate in the form of a substantially flat elongated member which includes a magnetic medium 74c disposed thereon. For example, the substrate might be mylar tape with some form of magnetic oxide disposed thereon. The flat member 80c is translated in a linear fashion by some drive mechanism (not shown), for example, by tape reels attached to drive motors. The substrate may move in direction, $x_{(+)}$, or $x_{(-)}$, as shown, in a geometric relationship with a thin film MR read-write head 70c, also as shown. When there is relative motion between the substrate 80c and 70c, the head may be mounted on support 82c in the flying relationship described above, but also may be in contact with medium 74c, as in other embodiments. The read-write head 70c includes an MR read strip 72c and a write element 68c. The head suspension assembly 82b includes means for conducting read/write signals between drive electronics 62b–66b and the head. Mounting block 94c is preferably rigidly fixed but could also be arranged to allow head 70c to move in a perpendicular direction to the direction of movement of the substrate.

Relationship of Read-Write Head to Magnetic Medium

Pole tip elements of the write element 68 are schematically illustrated at 90 in FIG. 9 in an operating relationship with a track 100 of a translating magnetic medium. The medium may be rotating or moving in a linear fashion relative to the head, or the head may be moving relative to the magnetic medium. Flux reversals representing bits of magnetic information recorded on the track by the write head are schematically illustrated at 102. The number of these flux reversals per inch length of the track is a measure of the linear or bit density of the read head 72. When the length of the write head gap is reduced, the bit density is increased. Another important measure is of the write element 68 is the tracks per inch capability (TPIC). The narrower the width of the write element pole tip elements, the greater the TPIC. The product of the bit density and TPIC provides the areal density of the magnetic medium. This is a measure of how much information can be written per unit area of the magnetic medium.

Referring once again to FIG. 9, the spacing between bits, $b_s$, further increases the bit density of the medium allowing for a very large mount of magnetic information to be recorded on the medium. At the transition point from one bit 102 across the bit spacing, bs, to the next bit 102 there is a change in the magnetic flux. An important aspect of MR sensors is their extreme sensitivity to minute changes in flux, allowing them to take advantage of a very high areal density of the recorded bits. An MR sensor detects magnetic field signals through resistance changes of an element made from magnetoresistive material as a function of the mount and direction of magnetic flux being sensed by the element. Thus, it is preferred to employ an MR sensor used in combination with a write element having a very high areal density in the head 70. Such a combination allows for an encoder with resolution capabilities far exceeding that obtainable with the highest resolution optical encoders. The order of spacing between slots in an optical encoder is about 50–100 microns while the spacing between bits, $b_s$, in the present invention may be on the order of about 0.2 microns. This is about a 250 times increase in resolution.

An Embodiment of an MR Read-Write Head

Figure 10:
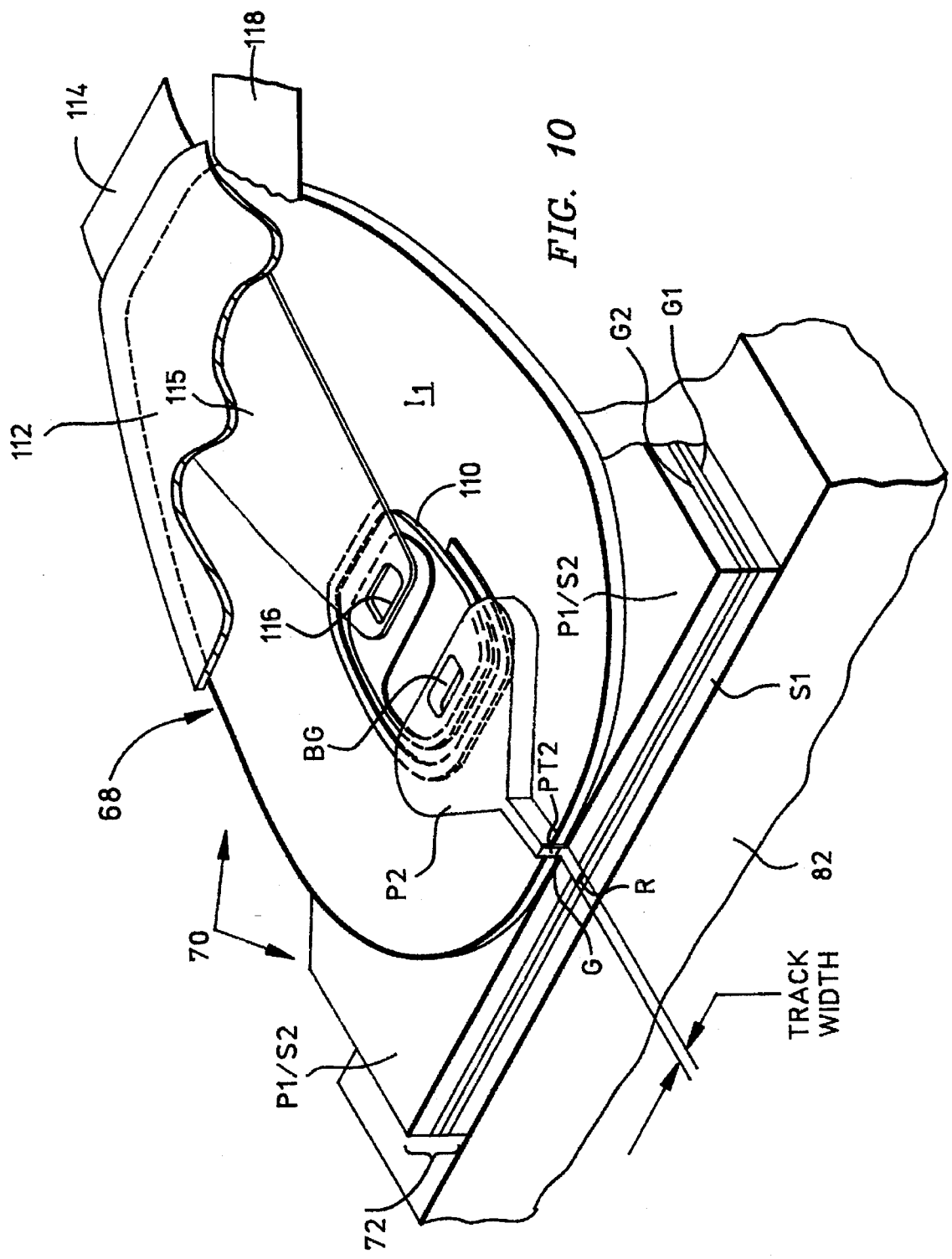
FIG. 10 illustrates an embodiment of a MR read-write head that may be employed with the present invention.

FIG. 10 illustrates a portion of a MR read-write head 70 showing the MR read element 72 and the inductive write element 68. The head is supported by a support 82. The MR read stripe 72 includes a magnetoresistive element 77 which is sandwiched between first and second gap layers G1 and G2, the gap layers in turn being sandwiched between first and second shield layers S1 and S2. In this head the second shield layer S2 of the read stripe 72 also serves as the bottom pole piece P 1 for the write element 68. The head 70 is referred to as a thin-film merged head, because the read element is closely arranged with the write element and combined in one thin-film assembly.

Further referring to FIG. 10, the write element 68 has a pole tip region which is located proximate to the magnetic medium. The write element 68 includes a bottom pole piece P1 and a top pole piece P2. The bottom pole piece P1 also serves as the second shield layer S2 of the read stripe 72, and thus is designated as P1/S2. Each pole piece P1 and P2 also has a back layer portion which is located in the back region, the back layer portions of the pole pieces being magnetically connected at the back gap (BG). The bottom pole piece P1 includes a pole tip structure which is located in the pole tip region near the magnetic medium while in operation. This pole tip structure includes a bottom pole tip element PT1a and a top pole tip element PT1b. The top pole piece P2 includes a pole tip structure which is located in the pole tip region. This pole tip structure includes a top pole tip element PT2. The pole tip elements PT1a and PT1b are integrally formed from second shield S2 of the read stripe 72. A pole gap layer (G) is sandwiched between the pole tip elements PT1b and PT2. A desired thickness (gap length) of this layer is about 0.3 µm which will optimize the linear density of the write element without sacrificing its flux intensity. However, acceptable gap lengths range from 0.1 µm to 0.7 µm. The gap layer G may extend to the back gap BG or alternatively may terminate at the zero throat level.

As shown in FIG. 10, an insulation layer $I_1$ is deposited on top of the gap layer G by any suitable method such as photolithography. On top of the insulation layer $I_1$ there is deposited a coiled conductor layer 110 by any suitable method such as photoresist frame plating. On top of the coiled conductor layer 110 there are preferably deposited at least second and third insulation layers by any suitable means, such as photolithography; however, additional layers are not shown for the sake of simplicity.

FIG. 10 further illustrates a more complete embodiment of the write element with portions cut away to illustrate various details thereof. Part of a cover layer 112 has been broken away, insulation layer $I_1$ is shown and a portion of the coiled conductor layer 110 is shown. The conductor 110 extends around the back gap BG between the top and bottom pole pieces P2 and P1. One end of the coil conductor 110 is connected to a lead 115 at 116 and the other end of the conductor (not shown) is connected to a lead 118. When a signal current is transmitted to the conductor 110 via the leads 115 and 118, the conductor 110 induces flux in the top and bottom pole pieces P2 and P1. This, in turn, induces flux back and forth across the pole tips at the point most proximate to the magnetic medium.

Although a thin-film head of an integrated configuration as shown in FIG. 10 is one preferred embodiment of the present invention, the use of such a configuration is not the only type of head which may be used to implement the invention. However, for the sake of completeness, reference may be made to U.S. Pat. No. 3,908,194 by Romankiw, for details on a method of making a head of an integrated configuration. This patent is herein incorporated by reference and is assigned to the assignees of the present invention. The inventors recognize that a twin track read-write head with an inductive write circuit and a magnetoresistive read element, as described in detail in *The Complete Handbook of Magnetic Recording*, 3rd Edition, Finn Jorgenson, Chap. 10, pp. 247–249, will also suffice to enable the utility of the present invention. The critical aspect is that the encoder must have a MR read element and an inductive write element so that the encoder may write encoded bits on the disk medium and then read back these same bits with the same device. This is a significant advantage over the prior art because an existing encoder may be adapted to have a different resolution simply by rewriting the encoded bits. Further, a device that had previously been an incremental encoder may be changed to an absolute encoder by writing encoded information. Still another advantage of the present invention is that a manufacturer of encoders will not have to stock various pre-encoded magnetic media. Rather, the manufacturer may simply keep unrecorded media on hand and then write encoded information on the medium according to customer requirements.

Multiple Heads Within a Housing Assembly

Figure 11:
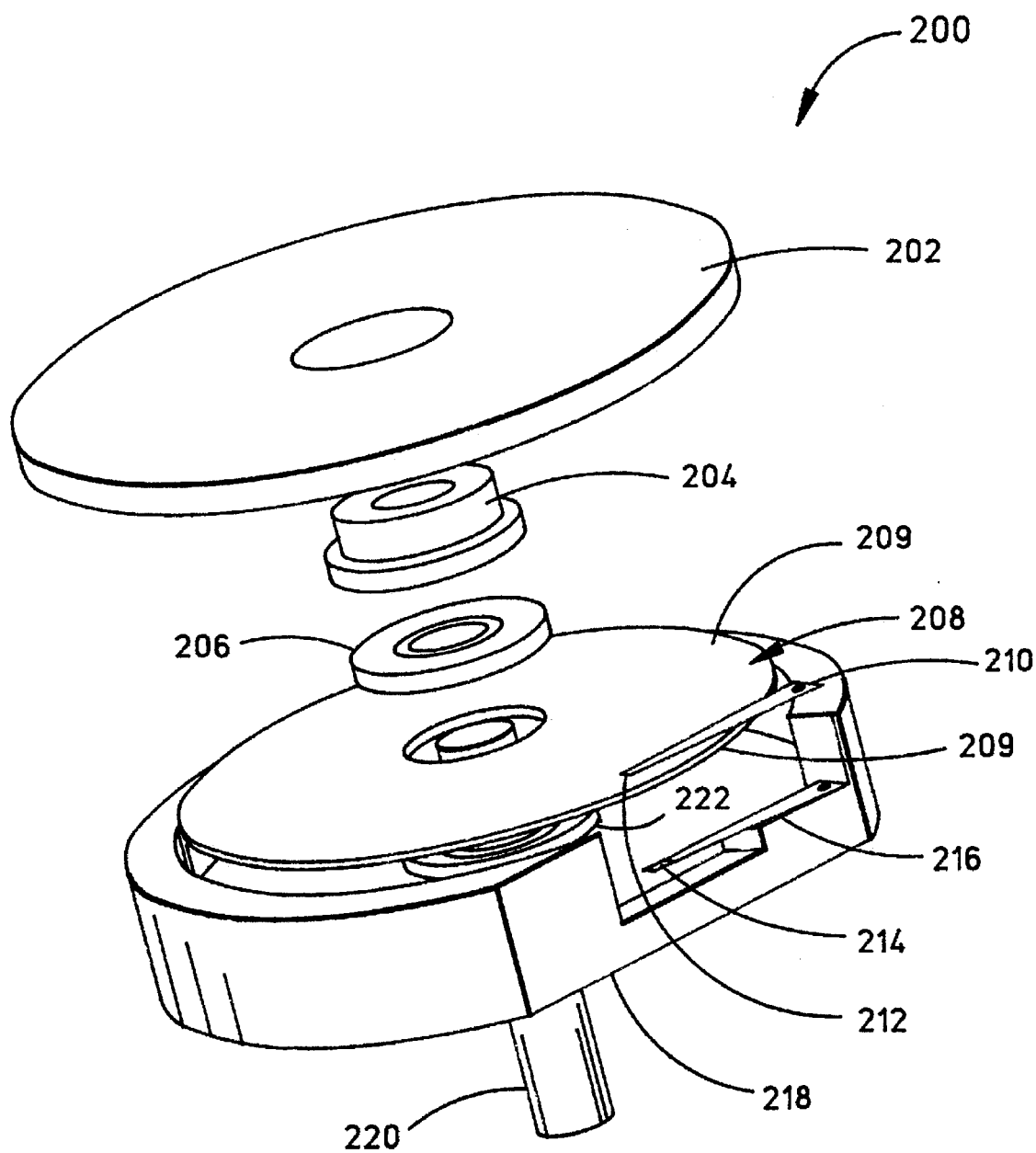
FIG. 11 shows an embodiment of the present invention employing more than one MR read write head.

Referring to FIG. 11, a detailed assembly 200 employing one embodiment of the present invention that is arranged with a disk 208 is shown, and it includes two MR read-write heads 212 and 214. The read/write magnetic encoder assembly 200 is coupled to a shaft 220 and a control motor (not shown). As shaft 220 is turned the disk 208 and disposed magnetic medium 209 also rams. The shaft 220 may be coupled directly or indirectly to a shaft for which it is desirable to know the position of rotation at any given time. For direct coupling the shaft 220 is preferably constructed with a hollow center. A primary MR read-write head 212 having an MR read element and an inductive transducer write element, as described above, is suspended from primary suspension 210. The head having read-write capability is suspended in a transducing relationship with magnetic medium 209.

A secondary MR read-write head 214 having an MR element for reading and an inductive transducer for writing is suspended from secondary suspension 216. The purpose of the secondary MR head is to allow for reading and writing on both sides of a rigid disk 208, having medium 209 disposed on either side. It should be noted that the inventors recognize that more heads than two may be employed if desired, without departing from the spirit of the invention.

The rigid disk 208 and the primary and secondary MR read-write head are preferably sandwiched in a protective housing comprised of encoder casing 218 and encoder casing cap 202. An upper spacer 206 and a lower spacer 222 separate the rigid disk 208 from the upper bearing 204 and a lower bearing (not shown). The shaft 220 is supported in rotation by the lower bearing, and the upper bearing supports the rotation of the encoder assembly 200. The physical dimensions of the encoder may be adapted to fit a variety of needs and can easily conform to industry standards (e.g. N.E.M.A. 17, 23, 34, and so forth). Wiring (not shown) may be used to connect to an electronics interface for the encoder. Such an interface may be an type well known in the art of thin/film rigid disks that are currently capable of transfer data rates of about 50 Mhz. This rate is about 250 times better than the 100–200 Khz rates that are the best available with prior art recorders.

The read/write magnetic encoder of the present invention is unique from all prior art encoders because it has the ability to write encoded information and then read the same encoded information. The rigid disk medium 209 is preferably a magnetic thin film rigid disk, but may also be a flexible disk. Such a medium used with the MR read-write head 70 allows for spacing between bits as small as 0.2 microns. Such spacing is 250 times smaller then that available with a typical high resolution optical encoder. Thus resolution of the encoder is greatly improved over prior art encoders, either optical or magnetic.

The use of the secondary MR head is particularly preferred for using the encoder 200 in absolute mode. The use of the secondary head enables the encoder to store information on a track such as track 100, that is absolute information relative to a shaft position. A significant advantage of this embodiment is that the encoder is enabled to have an unlimited number of turns when being used in absolute mode. However, absolute mode may be accomplished readily with the encoder of the present invention without requiring that two heads be used. A well known multiple channel MR read/write head can also be used with the present invention to create a reference signal for determining absolute position information.

In any of the above described embodiments, there is fixed relationship between the writing element and the reading element because the two elements are part of the same MR head. This relationship assures alignment of the encoded bits. This inherent alignment control eliminates critical alignment concerns with optical encoders, and particularly high resolution models. The read/write encoder of the present invention yields significant advantages in terms of alignment over the prior art. However, the cost of the encoder is no more than about $100 for significantly higher resolution than any prior art encoder, because of the higher sensitivity of the MR sensor. This is significantly better than the above discussed prior art where high resolution models tend to cost about $6000 dollars. Thus, the present invention yields a resolution which is 250 times better than the best prior art configuration, while the prior art has the further disadvantage of costing about 60 times more.

Other embodiments and modifications of this invention may occur to those of ordinary skill in the art in view of these teachings. Therefore, this invention is to be limited only by the following claims, which include all such embodiments and modifications when viewed in conjunction with the above specification and accompanying drawings.

What is claimed is:

1. A magnetic read-write encoder coupled to a moving object for determining a position of the moving object, the encoder being further coupled to read signal circuitry and write signal circuitry, the read signal circuitry and the write signal circuitry being coupled to an electronic signal processor, the encoder comprising:

a substrate;

a magnetic medium disposed on at least one side of the substrate;

a magnetoresistive (MR) read-write head having an MR read element and an inductive transducer write element, the MR read-write head being in a transducing relationship with respect to the magnetic medium;

means for causing relative motion between the magnetic medium and the MR read-write head, such that the transducing relationship is maintained;

the inductive transducer write element being adapted to dynamically write encoded bits received from the dynamically write circuitry, on the magnetic medium, the encoded bits containing information that defines a rotational position of the medium; and the MR read element being adapted to read the encoded bits and to generate an output signal based on the encoded bits that is sent to the read circuitry for sending to the electronic signal processor in order to decipher the rotational position of the moving object.

2. The magnetic read-write encoder of claim 1 wherein the substrate is a rigid disk shape.

3. The magnetic read-write encoder of claim 1 wherein the substrate is drum-shaped.

4. The magnetic read-write encoder of claim 1 and further comprising at least one additional MR read-write head that is substantially identical to the MR read-write head of claim 1 and being arranged in a transducing relationship with the magnetic medium.

5. The magnetic read-write encoder of claim 1 wherein the MR read-write head has a plurality of channels for communicating.

6. The magnetic read-write encoder of claim 4 wherein at least one MR read-write head has a plurality of channels for communicating.

7. A magnetic read-write encoder coupled to a moving object for determining a position of the moving object for use with a magnetic medium disposed on at least one side of a substrate, the encoder being further coupled to read signal circuitry and write signal circuitry, the read signal circuitry and the write signal circuitry coupled to an electronic signal processor, the encoder comprising:

a magnetoresistive (MR) read-write head having as MR read element and an inductive transducer write element, the MR read-write head being in a transducing relationship with respect to the magnetic medium;

means for causing relative motion between the magnetic medium and the MR read-write head, such that the transducing relationship is maintained;

the inductive transducer write element being adapted to dynamically write encoded bits received from the write circuitry on the magnetic medium, the encoded bits containing information that defines a rotational position of the medium; and the MR read element being adapted to read the encoded bits and to generate an output signal based on the encoded bits that is sent to the read circuitry for sending to the electronic signal processor in order to decipher the rotational position of the moving object.

8. The magnetic read-write encoder of claim 7 wherein the substrate is disk-shaped.

9. The magnetic read-write encoder of claim 7 wherein the substrate is drum-shaped.

10. The magnetic read-write encoder of claim 7 and further comprising at least one additional MR read-write head that is substantially identical to the MR read-write head of claim 1 and being arranged in a transducing relationship with the magnetic medium.

11. The magnetic read-write encoder of claim 7 wherein the MR read-write head has a plurality of channels for communicating.

12. The magnetic read-write encoder of claim 10 wherein at least one MR read-write head has a plurality of channels for communicating.

13. A magnetic read-write encoder assembly coupled to a moving object for determining a position of the moving object, the encoder being coupled to read signal circuitry and write signal circuitry, the read signal circuitry and the write signal circuitry being coupled to an electronic signal processor, the encoder assembly comprising:

a substrate;

a magnetic medium disposed on at least one side of a substrate;

a magnetoresistive (MR) read-write head having an MR read element and an inductive transducer write element;

a housing;

a support mounted in the housing for supporting the MR read-write head in a transducing relationship with respect to the magnetic medium;

means mounted in the housing for causing relative motion between the magnetic medium relative to the MR read-write head, such that the transducing relationship is maintained; and the inductive transducer write element being adapted to dynamically write encoded bits received from the write circuitry on the magnetic medium, the encoded bits containing information that defines a rotational position of the medium; and the MR read element being adapted to read the encoded bits and to generate an output signal based on the encoded bits that is sent to the read circuitry for sending to the electronic signal processor in order to decipher the rotational position of the moving object.

14. The magnetic read-write encoder assembly of claim 13 wherein the substrate is disk-shaped.

15. The magnetic read-write encoder assembly of claim 13 wherein the substrate is drum-shaped.

16. The magnetic read-write encoder of claim 13 and further comprising at least one additional MR read-write head that is substantially identical to the MR read-write head of claim 1 and being arranged in a transducing relationship with the magnetic medium.

17. The magnetic read-write encoder of claim 13 wherein the MR read-write head has a plurality of channels for communicating.

18. The magnetic read-write encoder of claim 16 wherein at least one MR read-write head has a plurality of channels for communicating.

19. The magnetic read-write encoder assembly of claim 13 wherein the means for causing relative motion between the magnetic medium and the MR read-write head includes a load supporting bearing.

20. The magnetic read-write encoder assembly of claim 13 wherein the housing is comprised of an encasing base and an encasing cap such that the substrate and the MR read-write head are sandwiched between the encasing base and the encasing cap.

21. A method of creating a read-write magnetic encoder for determining a position of a moving object, the encoder being coupled to the moving object and also being further coupled to read signal circuitry and write signal circuitry, the read signal circuitry and the write signal circuitry being further coupled to an electronic signal processor, the method comprising the steps of:

disposing a magnetic medium on at least one side of a substrate;

placing a magnetoresistive (MR) read-write head having an MR read element and an inductive transducer write element in a transducing relationship with respect to the magnetic medium;

causing relative motion between the magnetic medium and the MR read-write head, such that the transducing relationship is maintained;

sending a signal from the write circuitry to the inductive transducer write element to dynamically write encoded bits defining a rotational position of the magnetic medium on the magnetic medium; and generating an output signal from the MR read element in response to a reaction to the written encoded bits on the magnetic medium as relative motion occurs between the MR read element and the magnetic medium; and sending the output signal to the read circuitry for passing to the electronic signal processor in order to decipher the rotational position of the moving object.

22. The method of claim 21 wherein the substrate is disk-shaped.

23. The method of claim 21 wherein the substrate is drum-shaped.

24. The method of claim 21 and further comprising the step of placing at least one additional MR read-write head that is substantially identical to the MR read-write head of claim 21 in a transducing relationship with the magnetic medium.

25. The method of claim 21 wherein the MR read-write head has a plurality of channels for communicating.

26. The method of claim 24 wherein at least one MR read-write head has a plurality of channels for communicating.

27. A method of creating a read-write magnetic encoder for determining a position of a moving object, the encoder being for use with a magnetic medium disposed on a substrate, the encoder being coupled to the moving object and also being further coupled to read signal circuitry and write signal circuitry, the read signal circuitry and the write signal circuitry being further coupled to an electronic signal processor, the method comprising the steps of:

placing a magnetoresistive (MR) read-write head having an MR read element and an inductive transducer write element in a transducing relationship with respect to the magnetic medium;

causing relative motion between the magnetic medium and the MR read-write head, such that the transducing relationship is maintained;

sending a signal from the write circuitry to the inductive transducer write element to dynamically write encoded bits defining a rotational position of the magnetic medium on the magnetic medium; and generating an output signal from the MR read element in response to a reaction to the written encoded bits on the magnetic medium as relative motion occurs between the MR read element and the magnetic medium; and sending the output signal to the read circuitry for passing to the electronic signal processor in order to decipher the rotational position of the moving object.

28. The method of claim 27 wherein the substrate is disk-shaped.

29. The method of claim 27 wherein the substrate is drum-shaped.

30. The method of claim 27 and further comprising the step of placing at least one additional MR read-write head that is substantially identical to the MR read-write head of claim 27 in a transducing relationship with the magnetic medium.

31. The method of claim 27 wherein the MR read-write head has a plurality of channels for communicating.

32. The method of claim 31 wherein at least one MR read-write head has a plurality of channels for communicating.

33. A magnetic read-write encoder coupled to a moving object for determining a position of the moving object, the encoder being further coupled to read signal circuitry and write signal circuitry, the read signal circuitry and the write signal circuitry being coupled to an electronic signal processor, the encoder comprising:

a substantially flat and elongated substrate;

a magnetic medium disposed on at least one side of the substrate;

a magnetoresistive (MR) read-write head having an MR read element and an inductive transducer write element, the MR read-write head being in a transducing relationship with respect to the magnetic medium;

means for causing relative motion between the magnetic medium and the MR read-write head, such that the transducing relationship is maintained;

the inductive transducer write element being adapted to dynamically write encoded bits received from the write circuitry on the magnetic medium, the encoded bits containing information that defines a position of the medium; and the MR read element being adapted to read the encoded bits and to generate an output signal based on the encoded bits that is sent to the read circuitry for sending to the electronic signal processor in order to decipher the position of the moving object.

* * * * *